Patented Feb. 22, 1938

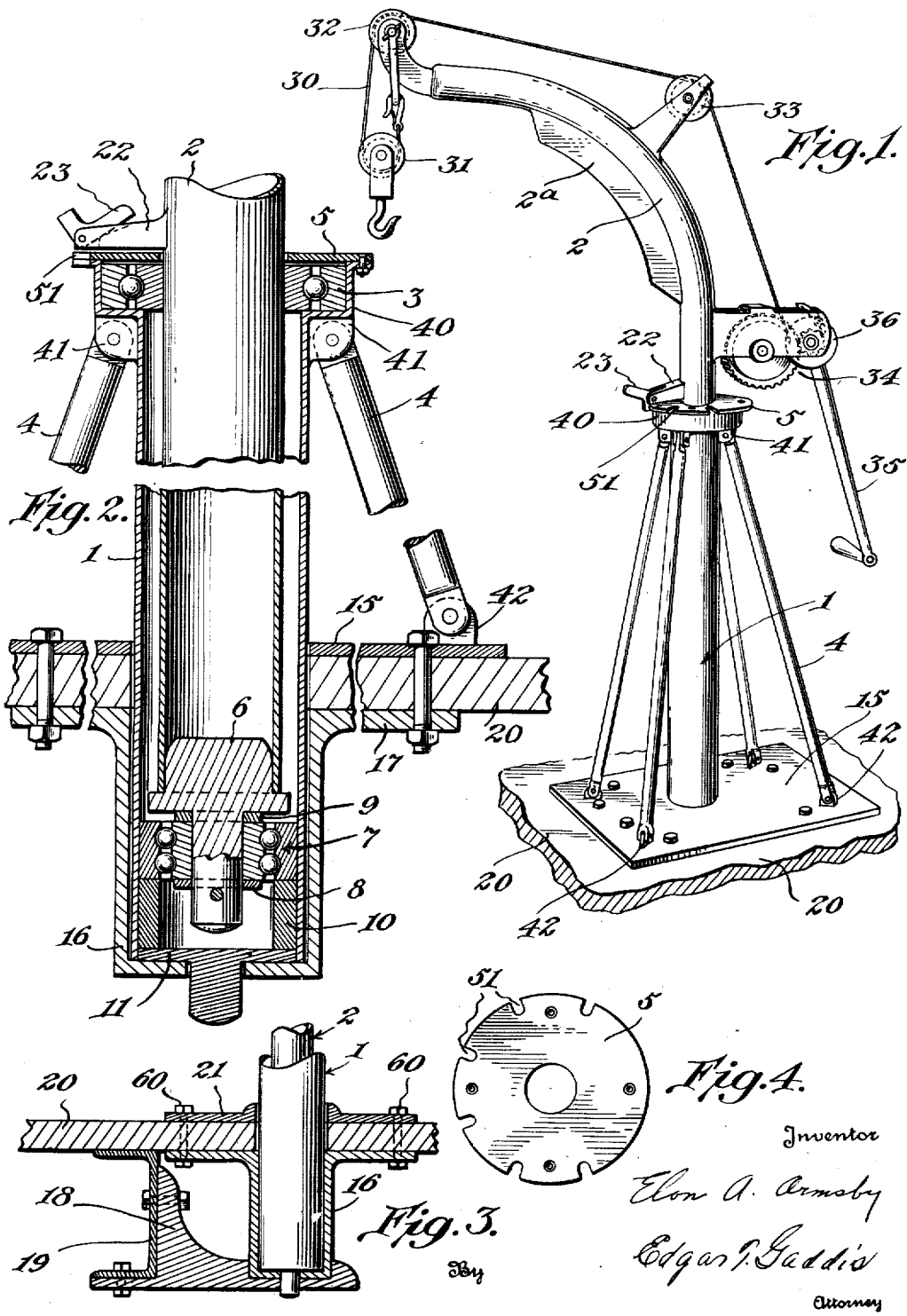

2,109,304

UNITED STATES PATENT OFFICE 2,109,304

CRANE

Elon A. Ormsby, Centerville, Calif.

Application June 15, 1937, Serial No. 148,392

2 Claims. (Cl. 212—65)

This invention relates to portable cranes, and the improvements are especially directed to the means for supporting a standard and a swinging or rotary mast mounted in bearings in the tubular standard.

The object of the invention is to provide improved means supporting the strains and for mounting the various parts on a truck or platform.

The invention will be more clearly understood from the following description and the accompanying drawing of one form thereof.

In the drawing, Figure 1 is a perspective view of the crane.

Figure 2 is a detail in section of the standard mounted on the truck platform and the lower part of the mast.

Figure 3 is a section of a modification.

Figure 4 is a plan view of a latch plate at the top of the standard.

Referring particularly to the drawing, 1 indicates a tubular standard and 2 indicates a tubular mast which is curved at the upper part and strengthened by a rib 2a and which telescopes at its lower end in the standard 1. The mast carries a suitable cable 30 running around a hook pulley 31, guide pulleys 32 and 33 and a hoisting gear 34 operated by a crank handle 35 and which may be equipped with a suitable brake 36 and such other devices as are commonly found in connection with a cable hoist.

The mast may be swung in any desired direction, and therefore the lower end thereof is provided with a pivot plug 6 welded or otherwise secured thereto which rests upon a ball bearing 7, the inner race of which is confined between washers 8 and 9 and the outer race of which rests upon a steel ring 10 fitting in the lower end of the tubular standard 1 and resting on a bottom piece 11 which has a depending pin fitting in a hole in a socket 16 having a flange 17 bolted to the underside of the platform 20. The standard fits through a hole in a top plate 15 bolted to the platform. This platform may be mounted on truck wheels for a portable crane, or it may be a fixed platform as desired.

At the top of the tubular standard the mast 2 extends through a ball bearing 3 which is held in a ring case 40 welded to the top of the tube 1, and the tube is provided with ears 41 between each pair of which is bolted the upper ends of brace rods 4, the lower ends of which are bolted to lugs 42 projecting from the base plate 15. A round plate 5 serves as a cap or cover for the ball bearing case 40 to which it is fixed by suitable screws, and the edge of the cap has notches 51 to receive a swinging latch 23 carried by a bracket 22 which is welded to the mast 2. The latch may be engaged in any of the notches to prevent the mast from rotating when desired. The outer race of the bearing 3 is held in the case 40 and the inner race is mounted on the mast 2.

The mast is therefore supported for free rotation by the upper ball bearing 3 and the lower ball bearing 7, and is capable of being turned or fixed in position as desired, the lower ball bearing 7 serving both as a radial and thrust bearing for the mast.

In the modified form shown in Figure 3, the socket 16 is additionally supported by being stepped in a knee bracket 18 which is bolted to one of the cross beams 19 supporting the platform 20, with a top plate 21 surrounding the standard, the plates being secured by bolts 60 extending through the platform.

By the means described the mast is rotatably mounted and may be easily swung in any desired position. A rigid support for the mast is provided and the parts are capable of being readily assembled on a truck or platform. The standard with its braces effectively supports side or tilting strains and the whole provides a very convenient assembly for a crane of this kind. It will be noted that the mast can be readily unshipped from the standard, all of the hoisting gear and cable guides being entirely mounted on the mast.

I claim:

1. In a crane the combination of a platform provided with a socket, a base plate secured upon the platform, a tubular standard extending through the base plate and fitting in the socket at its lower end, braces between the plate and the upper end of the standard, and a rotary mast the lower part of which fits within the standard and is provided with upper and lower bearings therein.

2. A crane comprising a platform, a bracket connected to the underside of the platform, a socket piece secured to the platform and stepped at its lower end into the bracket, a tubular standard supported at its lower end in the socket and extending upwardly through the platform, and a rotary mast telescoped in the standard and provided with upper and lower bearings therein.

ELON A. ORMSBY.